(12) United States Patent
Li et al.

(10) Patent No.: US 7,720,838 B1
(45) Date of Patent: May 18, 2010

(54) METHODS AND APPARATUS FOR JOINING TABLES FROM DIFFERENT DATA SOURCES

(75) Inventors: Wenfeng Li, Foster City, CA (US); Venkateswaran Venkataraman Iyer, Sunnyvale, CA (US); Houqiang Yan, Millbrae, CA (US); Aneesh M. Kulkarni, Foster City, CA (US); Peter Lai, Palo Alto, CA (US); Ajibayo O. O. A. Ogunshola, San Mateo, CA (US)

(73) Assignee: Actuate Corporation, South San Francisco, CA (US)

( * ) Notice: Subject to any disclaimer, the term of this patent is extended or adjusted under 35 U.S.C. 154(b) by 149 days.

(21) Appl. No.: 11/473,191

(22) Filed: Jun. 21, 2006

(51) Int. Cl.
*G06F 7/00* (2006.01)
(52) U.S. Cl. .................. 707/713; 705/714; 705/755
(58) Field of Classification Search .................. 707/1, 707/10, 100–102, 104, 200; 705/713, 714, 705/755
See application file for complete search history.

(56) References Cited

U.S. PATENT DOCUMENTS

| | | | |
|---|---|---|---|
| 5,325,525 A * | 6/1994 | Shan et al. .................. 718/104 |
| 5,497,486 A | 3/1996 | Stolfo et al. |
| 5,511,186 A * | 4/1996 | Carhart et al. .................. 707/2 |
| 5,694,591 A * | 12/1997 | Du et al. .................. 707/2 |
| 5,717,915 A | 2/1998 | Stolfo et al. |
| 5,894,565 A * | 4/1999 | Furtek et al. .................. 326/38 |
| 5,930,791 A | 7/1999 | Leu |
| 5,978,789 A * | 11/1999 | Griffin et al. .................. 707/2 |
| 6,105,017 A * | 8/2000 | Kleewein et al. ............... 707/2 |
| 6,108,651 A * | 8/2000 | Guha .................. 707/4 |
| 6,510,422 B1 * | 1/2003 | Galindo-Legaria et al. ...... 707/2 |
| 6,567,802 B1 * | 5/2003 | Popa et al. .................. 707/3 |
| 6,574,637 B1 * | 6/2003 | Lindsey .................. 707/104.1 |
| 6,609,123 B1 * | 8/2003 | Cazemier et al. ............... 707/4 |
| 6,631,382 B1 * | 10/2003 | Kouchi et al. ............... 707/102 |
| 6,732,096 B1 * | 5/2004 | Au .................. 707/5 |
| 6,745,198 B1 * | 6/2004 | Luo et al. .................. 707/102 |
| 6,804,678 B1 * | 10/2004 | Luo et al. .................. 707/101 |
| 6,850,927 B1 * | 2/2005 | Hsu .................. 707/2 |
| 6,901,403 B1 * | 5/2005 | Bata et al. .................. 707/101 |
| 7,085,769 B1 * | 8/2006 | Luo et al. .................. 707/102 |
| 7,143,076 B2 | 11/2006 | Weinberg et al. |
| 7,433,863 B2 * | 10/2008 | Zane et al. .................. 707/2 |
| 7,464,083 B2 | 12/2008 | Otter et al. |

(Continued)

OTHER PUBLICATIONS

"Uniform-distributed random generation of join orders"—Galindo-Legaria et al.—in Computer Science—1995—CiteSeer (pp. 1-3).*

(Continued)

*Primary Examiner*—Jean B. Fleurantin
*Assistant Examiner*—Anh Ly
(74) *Attorney, Agent, or Firm*—Weaver Austin Villeneuve & Sampson LLP

(57) ABSTRACT

Methods and apparatus for joining two or more tables are disclosed. A query including a join query is received, where the join query requests that a new table be generated from data obtained from two or more tables, where the two or more tables are stored at two or more different data sources. Data from the tables is retrieved corresponding to the query. A new table is then generated from the retrieved data.

51 Claims, 15 Drawing Sheets

U.S. PATENT DOCUMENTS

| | | | |
|---|---|---|---|
| 7,500,111 B2* | 3/2009 | Hacigumus et al. | 713/193 |
| 2002/0010695 A1* | 1/2002 | Kearsey et al. | 707/3 |
| 2002/0194196 A1* | 12/2002 | Weinberg et al. | 707/104.1 |
| 2003/0055814 A1* | 3/2003 | Chen et al. | 707/3 |
| 2003/0172059 A1* | 9/2003 | Andrei | 707/3 |
| 2004/0006561 A1* | 1/2004 | Nica | 707/3 |
| 2004/0015783 A1 | 1/2004 | Lennon et al. | |
| 2004/0111410 A1* | 6/2004 | Burgoon et al. | 707/4 |
| 2004/0181543 A1* | 9/2004 | Wu et al. | 707/102 |
| 2005/0060647 A1* | 3/2005 | Doan et al. | 715/514 |
| 2005/0071331 A1* | 3/2005 | Gao et al. | 707/4 |
| 2005/0125432 A1* | 6/2005 | Lin et al. | 707/101 |
| 2006/0041539 A1* | 2/2006 | Matchett et al. | 707/3 |
| 2006/0106766 A1* | 5/2006 | Bloom et al. | 707/3 |
| 2006/0136449 A1* | 6/2006 | Parker et al. | 707/101 |
| 2006/0167865 A1* | 7/2006 | Andrei | 707/4 |
| 2006/0173813 A1* | 8/2006 | Zorola | 707/2 |
| 2006/0218123 A1* | 9/2006 | Chowdhuri et al. | 707/2 |
| 2006/0253419 A1* | 11/2006 | Lin et al. | 707/1 |
| 2007/0073759 A1* | 3/2007 | El-Sabbagh | 707/102 |
| 2007/0094236 A1* | 4/2007 | Otter et al. | 707/2 |
| 2007/0156640 A1* | 7/2007 | Sengar | 707/2 |
| 2007/0156740 A1* | 7/2007 | Leland et al. | 707/102 |
| 2008/0228709 A1* | 9/2008 | Muras | 707/2 |
| 2008/0228710 A1* | 9/2008 | Muras | 707/2 |

OTHER PUBLICATIONS

"Canonical Abstraction for Outerjoin Optimization"—Rao et al.—Proceedings of 2004 ACM SIGMOD International Conference on Management of Data, Jun. 13-18, 2004, Paris, France (pp. 671-682).*

"Garlic: a new flavor of federated query processing for DB2"—Josifovski et al.—Proceedings of 2002 ACM SIGMOD International Conference on Management of data—ACM—2002 (pp. 524-532).*

Neubauer, Peter, "B-Trees: Balanced Tree Data Structures" www.bluerwhite.org/btree/ pp. 1-8 (1999).

U.S. Office Action dated Jun. 10, 2008 from related U.S. Appl. No. 11/473,190, 18 pgs.

U.S. Final Office Action dated Nov. 24, 2008 from related U.S. Appl. No. 11/473,190, 21 pgs.

U.S. Final Office Action dated Apr. 27, 2009 from related U.S. Appl. No. 11/473,190, 25 pgs.

* cited by examiner

Table 1: Customers 402

| Cust_ID 404 | Firstname 405 | Lastname 406 | City 408 |
|---|---|---|---|
| 1 | Bob | AGC | NYC |
| 2 | Dan | DEF | SF |
| 3 | Wenfeng | XYZ | NYC |

FIG. 4A

Table 2: Orders 410

| Order_ID 412 | Cust_ID 414 | Amount 416 |
|---|---|---|
| 1 | 2 | 10000 |
| 2 | 3 | 9000 |
| 3 | 3 | 12000 |
| 4 | 2 | 12000 |
| 5 | 2 | 9000 |
|  |  |  |

SELECT Customers.Cust_ID, CONCAT (Customers.Firstname, Customers.Lastname ) AS Name, Orders.Order_ID, Orders.Amount from Customers, Orders
    JOIN ORDERS ON Customers.Cust_ID = Orders.Cust_ID
WHERE Customers.City = 'NYC' AND Orders.Amount > 10000

FIG. 4C

Table 3 420

| Cust_ID 422 | Name 424 |
|---|---|
| 3 | Wenfeng XYZ |
|  |  |
|  |  |
|  |  |

FIG. 4D

Data source 1:
Select
Augment (e.g., concatenate)
·
·
·

Data source 2:
Select
Augment (e.g., concatenate)
·
·
·

FIG. 6

METHODS AND APPARATUS FOR JOINING TABLES FROM DIFFERENT DATA SOURCES

RELATED APPLICATIONS

This application is related to co-pending application Ser. No. 11/473,190, entitled "Methods and Apparatus for Processing a Query Joining Tables Stored at Different Data Sources," filed on the same day, by Wenfeng Li, et al, which is incorporated herein by reference for all purposes.

BACKGROUND OF THE INVENTION

The present invention relates to computer-implemented systems and methods for querying two or more tables associated with two or more different data sources. More specifically, the invention relates to systems and methods for joining two or more tables associated with two or more different data sources.

Typically, a user submits a query to retrieve data from a data source. Queries may be formatted in a variety of languages such as the SQL (Structured Query Language). Data that is queried is often stored in what is referred to as a "table."

A query is often used to retrieve data from a single table. In many circumstances, it may also be desirable to retrieve data from multiple data sources (e.g., tables). This may be accomplished by separately querying each of the data sources. However, the user may wish to retrieve the results of the query in the form of a single result set (e.g., table).

A join is a query that combines rows from two or more tables. It is possible to join two or more tables from the same data source together, resulting in a result set (e.g., table) representing the results of the query.

In view of the above, it would be beneficial if multiple tables from different data sources could be joined in an effective and efficient manner.

SUMMARY OF THE INVENTION

Methods and apparatus for joining two or more tables from different data sources are disclosed. More particularly, data from tables stored at two or more data sources is retrieved. From the retrieved data, a new result set (e.g., table) is generated.

In accordance with one aspect of the invention, methods and apparatus for joining two or more tables from two or more different data sources are disclosed. A query including a join query is received, where the join query requests that a new result set (e.g., table) be generated from data obtained from two or more tables. The tables are stored at two or more different data sources. More particularly, each of the tables may be stored at a different data source. Data is retrieved from the tables corresponding to the query. The new result set (e.g., table) is created from the retrieved data obtained from the tables.

In accordance with another aspect of the invention, rows from the tables are obtained and "joined" to create or populate a third table. The data for each row includes the data for the columns that satisfies the query. Thus, the data for each row may include data for one or more of the columns, depending upon the query.

In accordance with yet another aspect of the invention, one or more rows (and/or columns) for each of the tables for which data is to be obtained are identified from the query. The data is obtained for the identified rows (and/or columns), which is used to populate a new table.

In accordance with yet another aspect of the invention, one or more columns of the tables to index are identified. An index is built for each of the identified columns of the table. Data is retrieved from the tables for the corresponding indexed columns, as well as other columns that are required to satisfy the query. A join is executed on the indexed columns of the tables using the retrieved data.

In accordance with one embodiment, the data is retrieved in parallel (e.g., pipelined) with the joining of the identified (e.g., indexed) columns. In other words, a join is performed for a row when data has been retrieved for that row. Accordingly, data need not be retrieved for all rows for a join to be performed.

In accordance with yet another embodiment, the data that is retrieved includes only the data for the identified columns. Thus, data need not be retrieved for the remaining columns of the tables being joined. In this manner, data may be retrieved in the most efficient manner.

In accordance with another aspect of the invention, the invention pertains to a system operable to perform and/or initiate any of the disclosed methods. The system includes one or more processors and one or more memories. At least one of the memories and processors are adapted to provide at least some of the above-described method operations. In yet a further embodiment, the invention pertains to a computer program product for performing the disclosed methods. The computer program product has at least one computer readable medium and computer program instructions stored within at least one of the computer readable product configured to perform at least some of the above described method operations. In still a further embodiment, the invention pertains to data structures used to perform the disclosed methods.

These and other features of the present invention will be presented in more detail in the following detailed description of the invention and the associated figures.

BRIEF DESCRIPTION OF THE DRAWINGS

FIG. 4A is a diagram illustrating an exemplary Customers table that may be used in a join operation.

FIG. 4B is a diagram illustrating an exemplary Orders table that may be joined with the Customer table of FIG. 4A.

FIG. 4C is a diagram illustrating an exemplary query including a join statement that joins the Customers table of FIG. 4A and the Orders table of FIG. 4B.

FIG. 4D is a diagram illustrating a table that may be generated as a result of a join operation such as that presented in FIG. 4C.

FIG. 6 is a diagram illustrating exemplary functions supported by the data source(s).

DESCRIPTION OF THE PREFERRED EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable two or more tables from different data sources to be "joined." More particularly, rows from the tables are obtained and "joined" to create or populate a new result set (e.g., table). The data for each row that is joined may include data for all of the columns. Alternatively, the data for each row that is joined may include data for only a set of one or more of the columns.

In the following description, processes for joining two or more tables from different data sources are set forth. In these examples, two tables from different data sources are joined. However, it is important to note that these examples are merely illustrative, and therefore additional tables from the same or different data sources may be joined.

Figure 1:
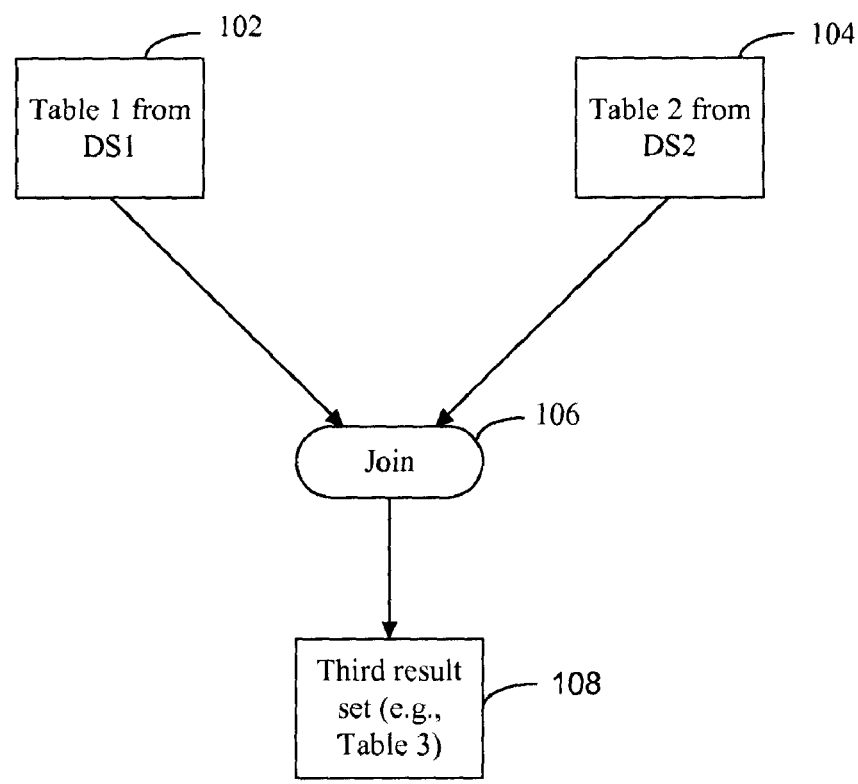
FIG. 1 is a diagrammatic representation of a join operation in which two result sets (e.g., tables) from different data sources are joined.

FIG. 1 is a diagrammatic representation of a join operation in which two tables from different data sources are joined. More particularly, a query including a join query is received from a user. The join query requests that a new table be generated from data obtained from two or more tables, where each of the tables is stored at a different data source. In this example, a first table, Table 1 102, is stored at a first data source and a second table, Table 2 104, is stored at a second data source. Data is retrieved from the tables 102 and 104 in accordance with the join query. The two tables 102 and 104 are joined resulting in the generation of a third result set 108, which may be provided in a third table using the data retrieved from the tables 102 and 104. The processes that are performed to support data retrieval and the join operation are described in further detail below.

Figure 2:
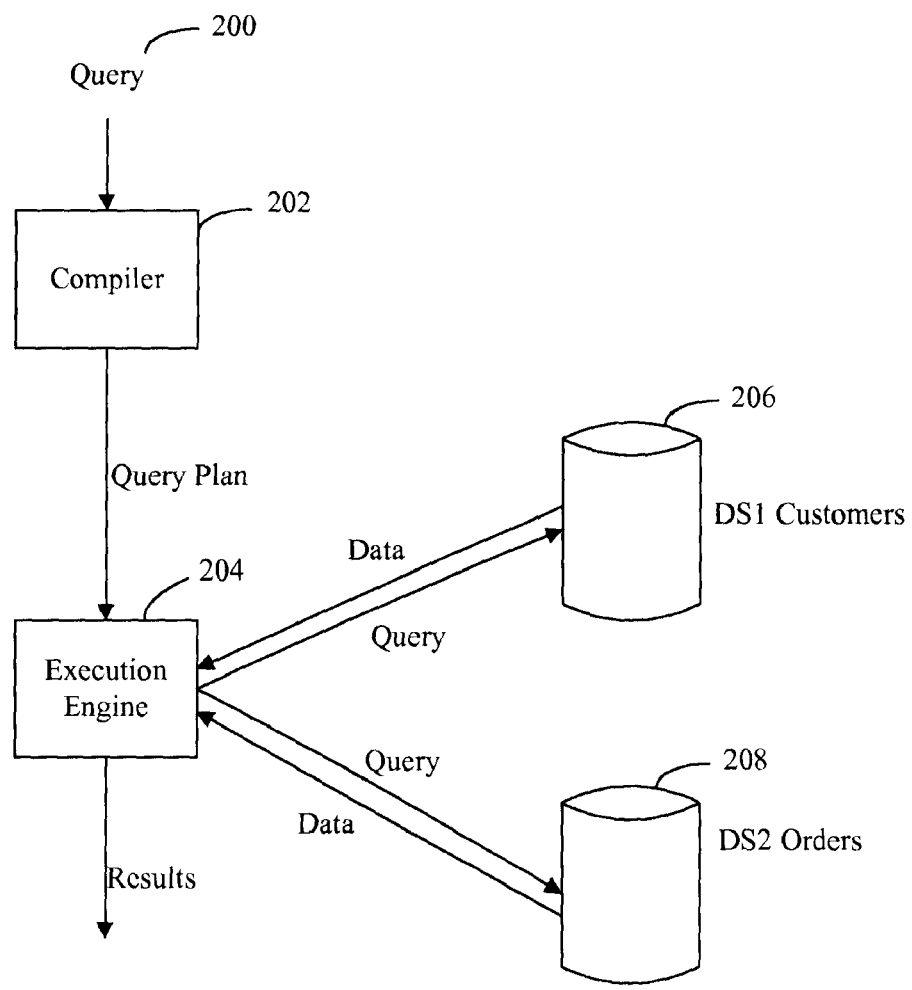
FIG. 2 is system diagram illustrating an exemplary system in which the present invention may be implemented.

FIG. 2 is system diagram illustrating an exemplary system in which the present invention may be implemented. In accordance with one embodiment, the query is a conventional SQL (Structured Query Language) statement indicating the field names for which data is to be obtained.

When the query 200 is received, it may be processed by a compiler 202. The compiler 202 generates a plurality of separate queries (e.g., SQL statements) from the initial query to enable each of the tables to be separately queried. More particularly a different set of queries (e.g., SQL statements) may be generated for each of the tables. These sets of queries may be referred to as a "query plan." An execution engine 204 is responsible for executing each set of queries (e.g., SQL statements) for each of the tables. In this example, a Customers table is stored at a first data source DS1 206 and an Orders table is stored at a second data source DS2 208.

Figure 3:
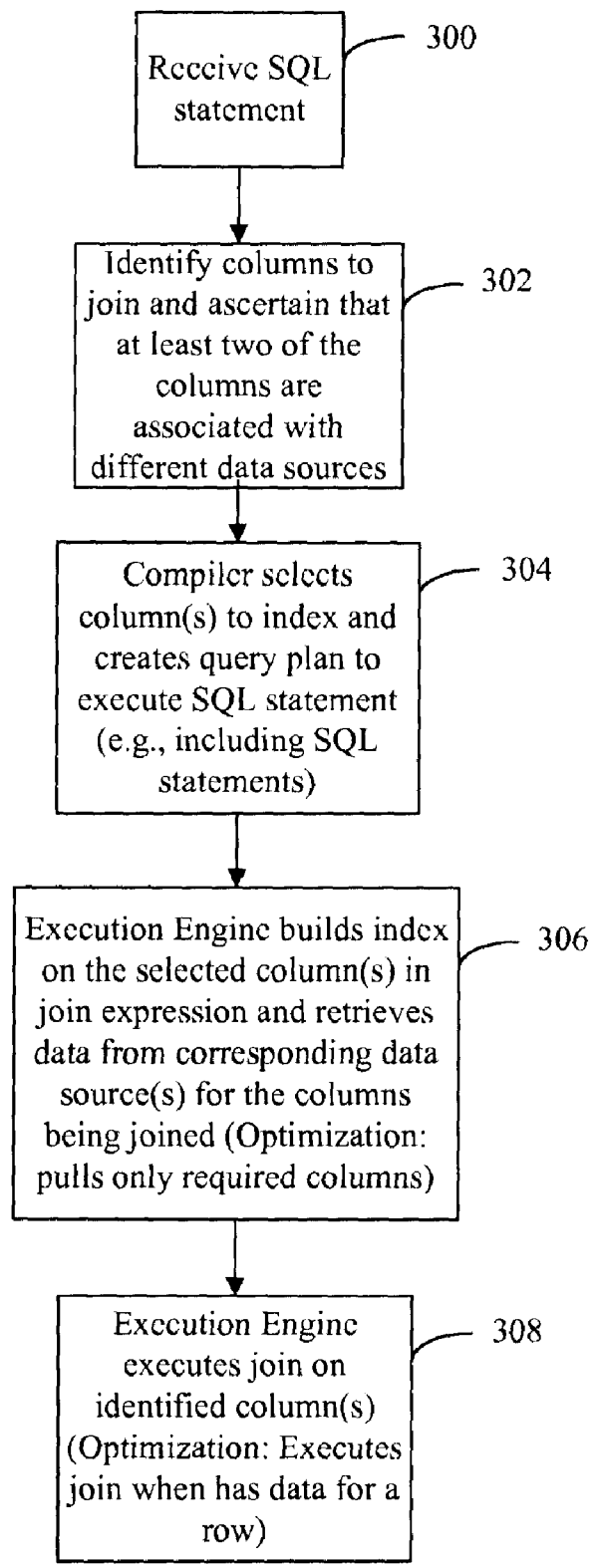
FIG. 3 is a process flow diagram illustrating a method of joining tables from different data sources in accordance with one embodiment of the invention

FIG. 3 is a process flow diagram illustrating a method of joining tables from different data sources in accordance with one embodiment of the invention. When a query such as a SQL statement is received at 300, the compiler identifies the columns to join at 302 and ascertains that at least two of the columns are associated with different data sources. For instance, each of the identified columns may be associated with a different data source. In accordance with one embodiment, the compiler ascertains that the data sources (e.g., databases) on both sides of the equal sign in the query are different.

The compiler selects the column(s) to index in accordance with the query and creates a query plan to execute the SQL statement at 304. The column(s) to index are selected by looking at the columns from the right-hand side expression of the join condition. Thus, the indexed columns may include all columns referenced in the expression on the right-hand side of the join condition. The query plan may include a set of SQL statements for each table/data source. Each of these SQL statements may also include a join condition.

The execution retrieves data from the corresponding data sources according to the query plan at 306 for the identified columns as referenced in the query. More particularly, in accordance with one embodiment, only data for columns needed to process the query are retrieved. These columns may include, for example, those columns to be indexed, as well as columns identified in a SELECT clause, etc. The execution engine builds an index on the selected column(s). Indexing may be performed in accordance with standard processes, such as a B-Tree or hash index. Indexing is typically used to enable rows (e.g., including a field having a particular value) to be identified quickly. As one example, indexing may be used to quickly identify customers within a particular region, as well as a subset of those customers who have orders greater than a specified amount.

While data may be retrieved for all columns, the process may be optimized by retrieving data for only those columns that have been selected. The execution engine then executes the join (e.g., in accordance with the query plan) on the identified columns (some of which are indexed) at 308. While data may be retrieved for all of the appropriate rows before a join is executed, data may be retrieved in pipeline (e.g., parallel) with the execution of the join operation (and therefore the generation/population of the resulting table). For instance, once a row of data has been retrieved from each of the tables, a join may be executed on that row without waiting for data from other rows. In this manner, a row of the new table may be populated when data has been retrieved for a row of the tables being joined.

Most join queries contain WHERE clause conditions that compare two columns, each from a different table. Such a condition is called a "join" condition. In addition to join conditions, the WHERE clause of a join query can also contain other conditions that refer to columns of only one table. These conditions can further restrict the rows returned by the join query.

In the following example, two different tables are joined to generate or populate a third table. FIG. 4A is a diagram illustrating an exemplary Customers table that may be joined in a join operation. The Customers table 402 includes a Customer Identifier (Cust_ID) column 404, a Firstname column 405, a Lastname column 406, and a City column 408. The Cust_ID column 404 includes a customer identifier that identifies the customer, the Firstname column 405 and the Lastname column 406 includes the corresponding customer name, and the City column 408 identifies a city in which the customer is located. For instance, the city may be San Francisco (SF) or New York City (NYC), as shown.

FIG. 4B is a diagram illustrating an exemplary Orders table that may be joined with the Customer table of FIG. 4A. The Orders table 410 includes an Order Identifier (Order_ID) column 412, a Cust_ID column 414, and an Amount column 416. The Order_ID column 412 includes the order identifier (e.g., order number) that identifies the order, the Cust_ID column 414 identifies the customer that placed the order, and the Amount column 416 includes the amount of the order.

FIG. 4C is a diagram illustrating an exemplary query including a join statement that joins the Customers table of FIG. 4A and the Orders table of FIG. 4B. As shown, a single SQL statement may include multiple clauses. The SELECT clause selects the columns for which data is to be retrieved, while the JOIN clause joins the data from the selected columns of the tables specified in the FROM clause to generate a third result set (e.g., table). In other words, the second statement includes the conditions under which the data is to be retrieved for the selected columns. More particularly, the Cust_ID column and the concatenation of the Firstname and the Lastname columns from the Customers table are selected. The JOIN clause specifies that the rows from the two tables specified in the FROM clause must be joined for customers who have orders with the condition Customers.Cust_ID=Orders.Cust_ID. The WHERE (or filter) CLAUSE filters the rows to be joined by restricting the rows from the Customers table where the City column has the value "NYC" and the rows from the order table where the Amount column has a value greater than 10000.

From the City column of the Customers table, it can be seen that two different customers are within the city "NYC." Specifically, Customer 1, "Bob AGC" and 3, "Wenfeng XYZ" are within the city "NYC." From the Orders table, there are no orders for Customer 1 and two orders for Customer 3. Of the two orders for Customer 3, the Amount of only one of the two orders is greater than $10000. Specifically, the Amount of Order_ID 3 is $12000. For this row, the Cust_ID and Name are retrieved and used to populate a third result set (e.g., table).

FIG. 4D is a diagram illustrating a table that may be generated as a result of the join operation of FIG. 4C. The Cust_ID and Name are retrieved for the row of the Orders table including Order_ID 3. Since the Cust_ID is 3, the corresponding name, "XYZ," is retrieved from the Customers table. The resulting table, Table 3 420, includes a Cust_ID column 422 and a Name column 424. The Cust_ID 3 and corresponding name "XYZ" populate a row of the table, as shown in FIG. 4D.

Figure 5A:
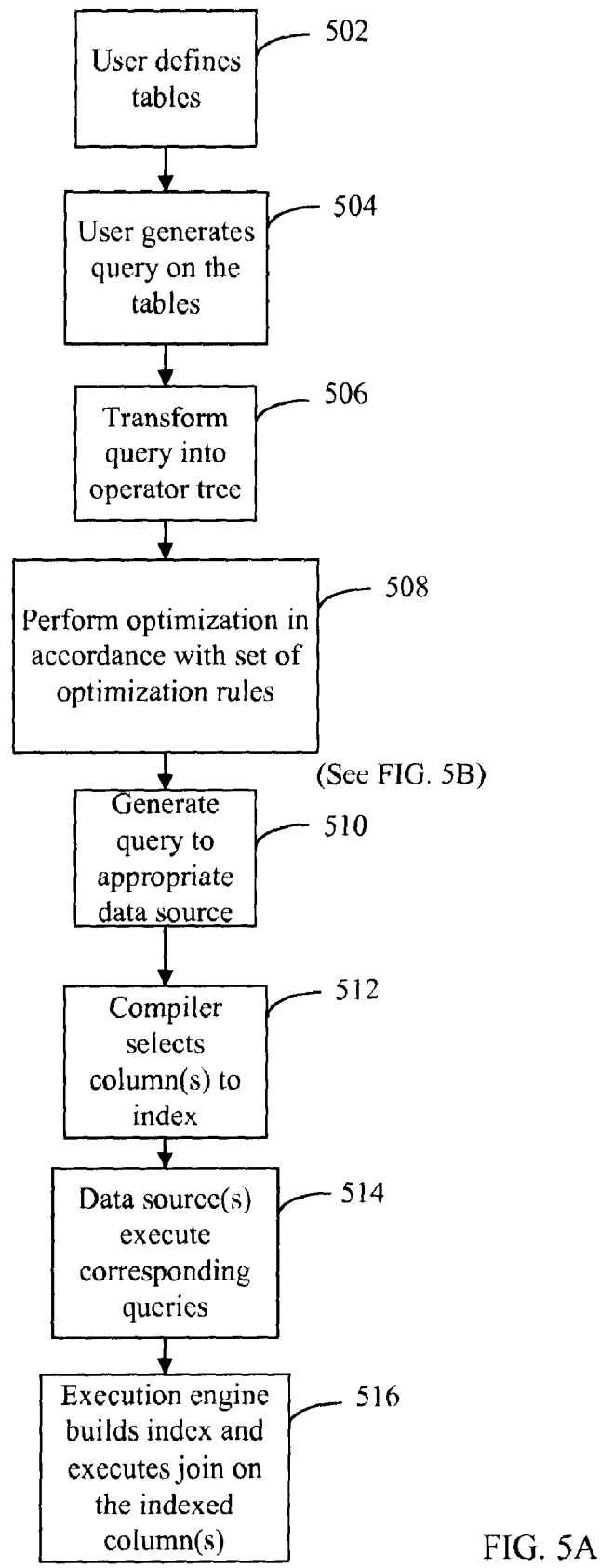
FIG. 5A is a process flow diagram illustrating a method of processing a user query in accordance with one embodiment of the invention.

FIG. 5A is a process flow diagram illustrating a method of processing a user query in accordance with one embodiment of the invention. In order to set up tables such as that set forth above with reference to FIGS. 4A and 4B, a user may define the tables at 502. The user may then generate a query on the tables at 504.

When such a query is received, the query may be parsed and transformed into an operator tree at 506, as will be described in further detail below. The operator tree may be based upon a hierarchical structure of the tables that the user has defined, as will be described in further detail below with reference to FIG. 7. Optimizations may then be performed on the operator tree at 508 in accordance with a set of optimization rules. One method of performing optimizations will be described in further detail below with reference to FIG. 5B. Such optimizations will be described in further detail below with reference to an exemplary operator tree as set forth in FIGS. 8A-8G.

Once all optimizations have been performed, as desired, a query to the appropriate data source(s) is then generated at 510. For instance, a different set of SQL statements may be generated for one or more of the data sources by the compiler, as appropriate. In addition, the appropriate column(s) to index may be selected by the compiler at 512. In accordance with one embodiment, steps 506-512 are performed by the compiler.

The execution engine executes the queries (e.g., SQL statements) that have been generated by the compiler to obtain the data that has been requested by the user in the query that has been submitted. More particularly, the SQL statements may be executed by the corresponding data sources at 514.

The selected column(s) are indexed (e.g., by the execution engine) at 516. Once the index has been built, the execution engine may execute the join on the indexed column(s) using the data that has been retrieved from the data sources.

Figure 5B:
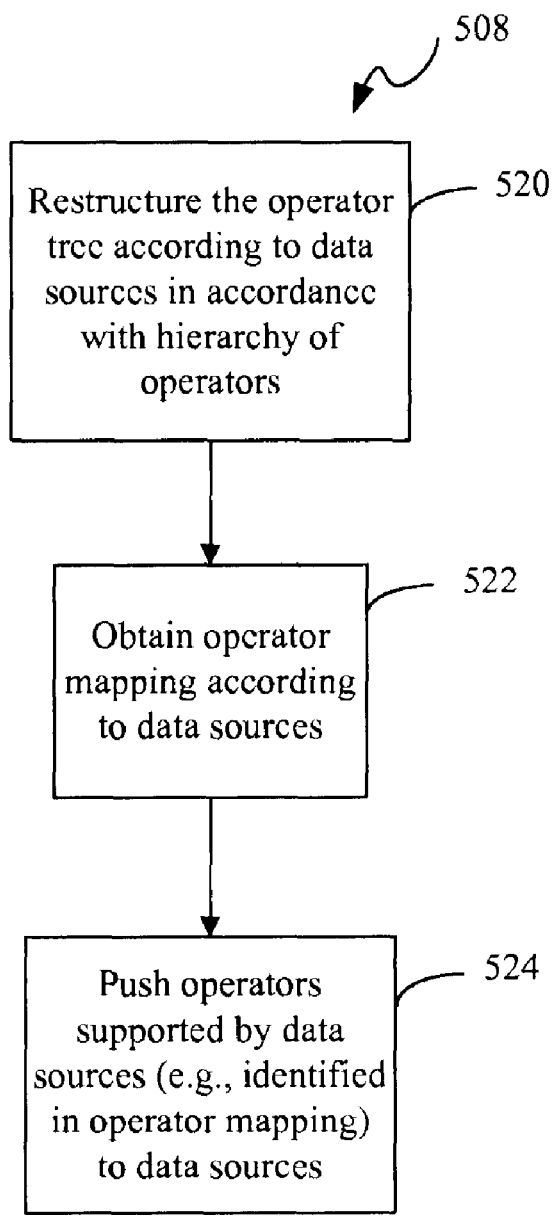
FIG. 5B is a process flow diagram illustrating a method of performing optimization in accordance with one embodiment of the invention as shown at 508 of FIG. 5A.

As described above with reference to 508 of FIG. 5A, the operator tree may be optimized. FIG. 5B is a process flow diagram illustrating a method of performing optimization in accordance with one embodiment of the invention. As shown at 520, the operator tree may be restructured. The restructuring may be performed in accordance with a hierarchy of operators. For instance, in a mathematical operation (1+2)×(3+4), the "+" operator is executed prior to the "×" operator. Similarly, an "Augment" (e.g., concatenation) operation may be executed prior to a "Join" operation. From this hierarchy, it is possible to restructure the operator tree.

Generally, a join operation is typically performed by the data source in which the tables being joined are stored. However, where the tables are stored at separate data sources, the data source can no longer perform the join operation. Those operations that can be performed by each data source may be "pushed" to the data source(s) to offload these operations to the data source(s), thereby optimizing the join operation and the query as a whole.

In order to ascertain those operators that can be "pushed" to the data sources, an operator mapping is obtained for the data sources at 522. From each operator mapping, those operators that are supported by the data sources may be ascertained. The operators that are supported by the data sources (e.g., identified in the operator mapping) may be pushed to the data sources at 524.

Optimizations may be performed in accordance with a set of optimization rules. For instance, the set of optimization rules may set forth an order in which optimizations are to be performed (e.g., the priority of operations and therefore the order in which they are to be pushed to the corresponding data source). Other optimization rules may include pushing WHERE clause expressions (e.g., filter conditions or expressions) to the data source, pushing ORDER BY (sort) operations to the data source, and pushing GROUP BY (grouping) operations to the data source.

Once all optimizations have been performed, a separate query may be generated for each data source. As set forth above, each such query may include a set of one or more SQL statements. The SQL statements that have been generated may then be executed.

As set forth above with reference to 522 of FIG. 5B, each data source may support a different set of operations, which may be represented by various operators. The set of operations supported by each data source may be referred to as an "operator mapping." FIG. 6 is a diagram illustrating exemplary operations that are supported by the data source(s). In this example, the SELECT operation and the AUGMENT (e.g., concatenation) operation are supported by both data sources. Thus, the SELECT and CONCATENATION operations for columns for tables stored at a particular data source may be performed by that data source. However, other operations such as a join or concatenation operation performed on columns from two or more tables stored at different data sources are not supported by either of the data sources, and therefore are performed external to the data sources, as appropriate.

Figure 7:
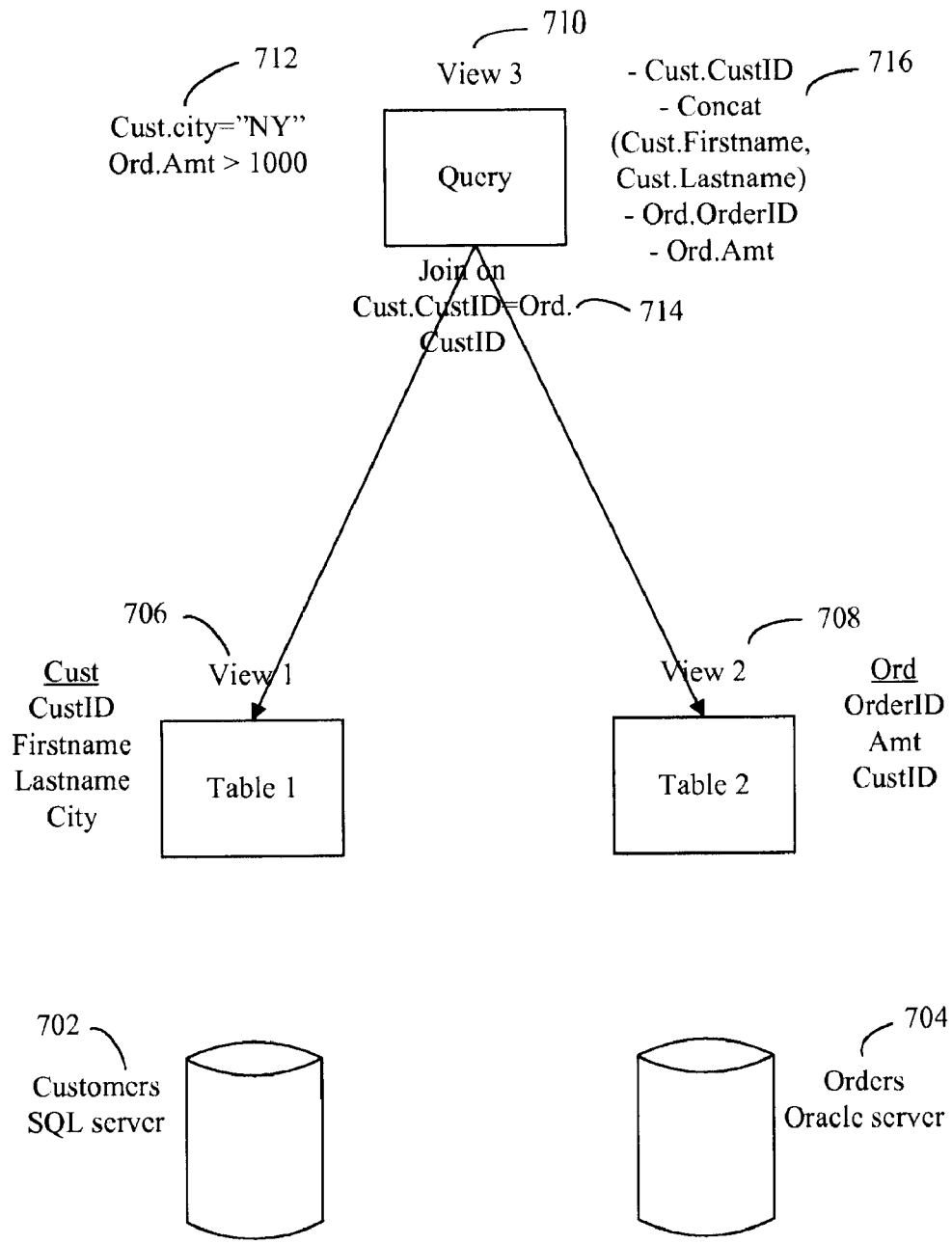
FIG. 7 is an exemplary hierarchy of views built by a user that represents the tables being queried and the corresponding query.

The user may also wish to define tables, which may be related in a hierarchical manner. Thus, the query may be associated with a hierarchical model generated by a user submitting the query. FIG. 7 is an exemplary hierarchy of views built by a user that represents the tables being queried and the corresponding query. Each table may be referred to as a "view." Similarly, the table generated as a result of the user query may also be referred to as a view.

In this example, a Customers database 702 is stored at a SQL server and an Orders database 704 is stored at an Oracle server. The user creates a first view 706, View 1, of the Customers database 702, which includes a Customers table, Cust. As shown, the Customers table (i.e., Customers view) includes a CustID field, Firstname field, Lastname field, and City field. In addition, the user creates a second view 708, View 2, of the Orders database 704, which includes an Orders table, Ord. As shown, the Orders table (i.e., Orders view) includes an OrderID field, an Amt field, and a CustID field.

When the user submits a query, View 3 710 is created. As shown at 712, the user queries all customers in New York who have orders greater than $1000. A join is performed for Cust.CustID=Ord.CustID at 714. The result of the query is shown at 716, which includes the Customer ID, a concatenation of the Customer's first and last name (as identified by columns Firstname and Lastname), the Order_ID and the Amount columns, as obtained from the corresponding tables and associated data sources.

In accordance with one embodiment, an operator tree representing the user query is generated. More particularly, the query is parsed to generate an operator tree. In the following example, optimizations that may be performed on the operator tree in accordance with a set of optimization rules are illustrated with reference to FIGS. 8A-G.

Figure 8A:
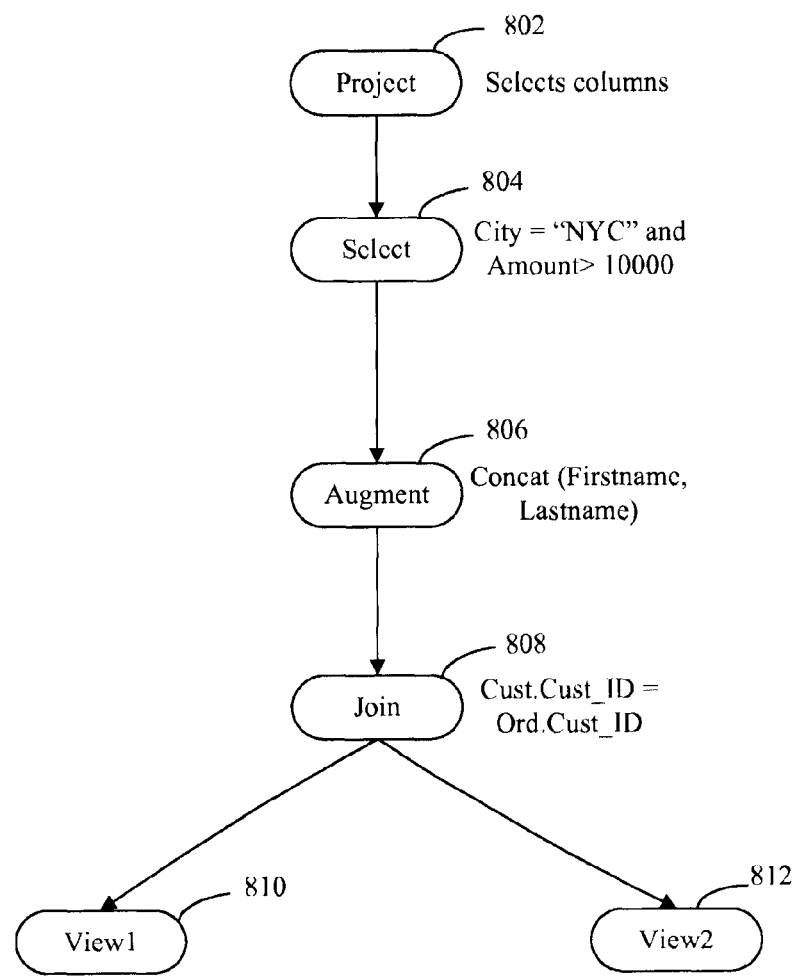
FIGS. 8A through G together represent an operator tree and optimizations performed on the operator tree in accordance with one embodiment of the invention.

In accordance with one embodiment, an operator tree is generated based upon the query submitted by the user. FIG. 8A is an exemplary operator tree that may be generated based upon a user query such as that set forth above with reference to FIG. 7. As shown in this example, the operators are represented by elements 802, 804, 806, and 808. More particularly, the "JOIN" operator 802 specifies the columns that will be indexed. The "Select" operator 804 filters the rows for which columns are to be selected based upon the conditions specified. In this example, the conditions specify that the customer live in New York City and the amount of the order be greater than 10000. The "Augment" operator 806 represents the concatenation command, as shown. The "Join" operator that joins both tables on the condition Cust.Cust_ID=Ord.Cust_ID is shown at 808. The leaf nodes 810 and 812 represent Views 1 and 2, respectively. In other words, the leaf nodes 810 and 812 represent the data sources and corresponding tables being queried (e.g., joined). The operator tree may be generated using a variety of data structures, such as linked lists, arrays, and objects.

Figure 8B:
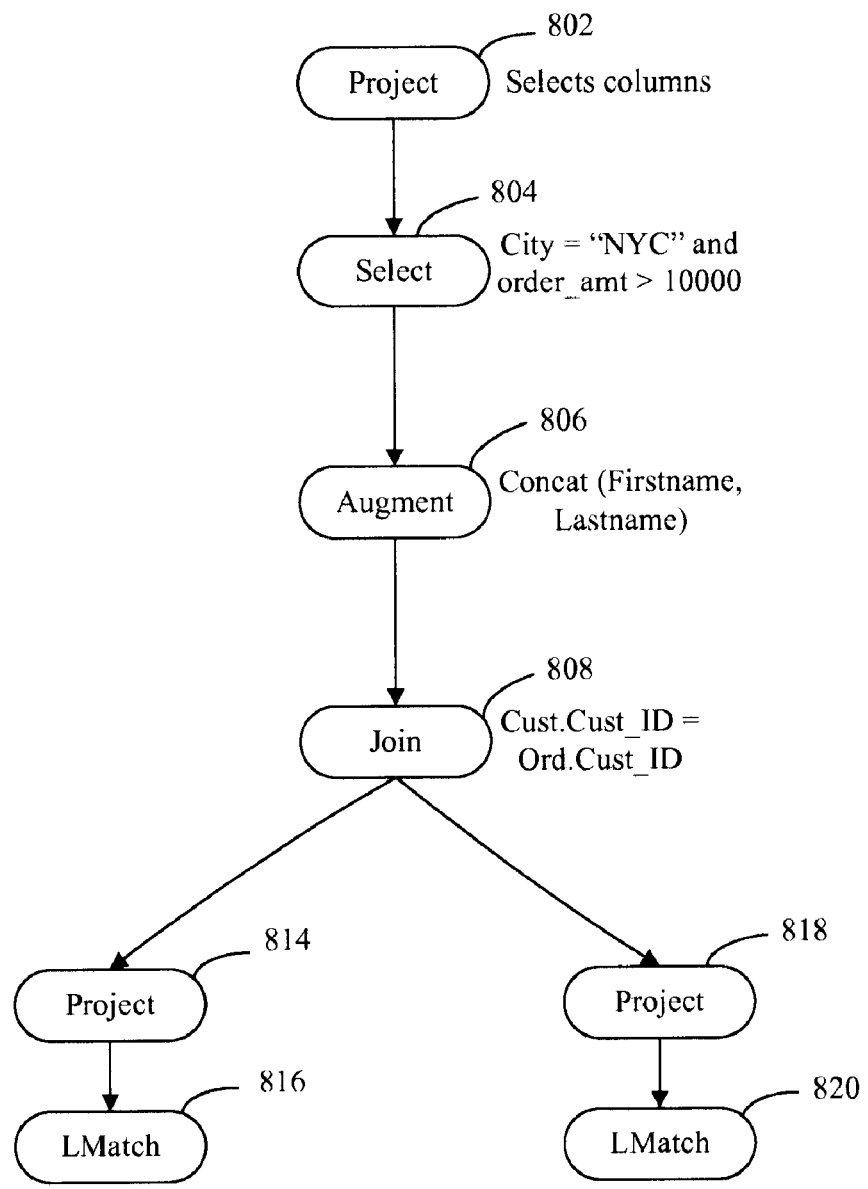

By traversing the operator tree, the operator tree may be restructured. As shown in FIG. 8B, both views, 810 and 812, may be expanded such that each view is represented by a separate operator tree. In the first step of expansion, View 1 is expanded into a corresponding "Project" Operator 814 and "LMatch" operator 816. Similarly, View 2 is expanded into a corresponding "Project" operator 818 and "LMatch" operator 820. Each "LMatch" operator represents the columns from the tables in the data sources that are being queried.

Figure 8C:
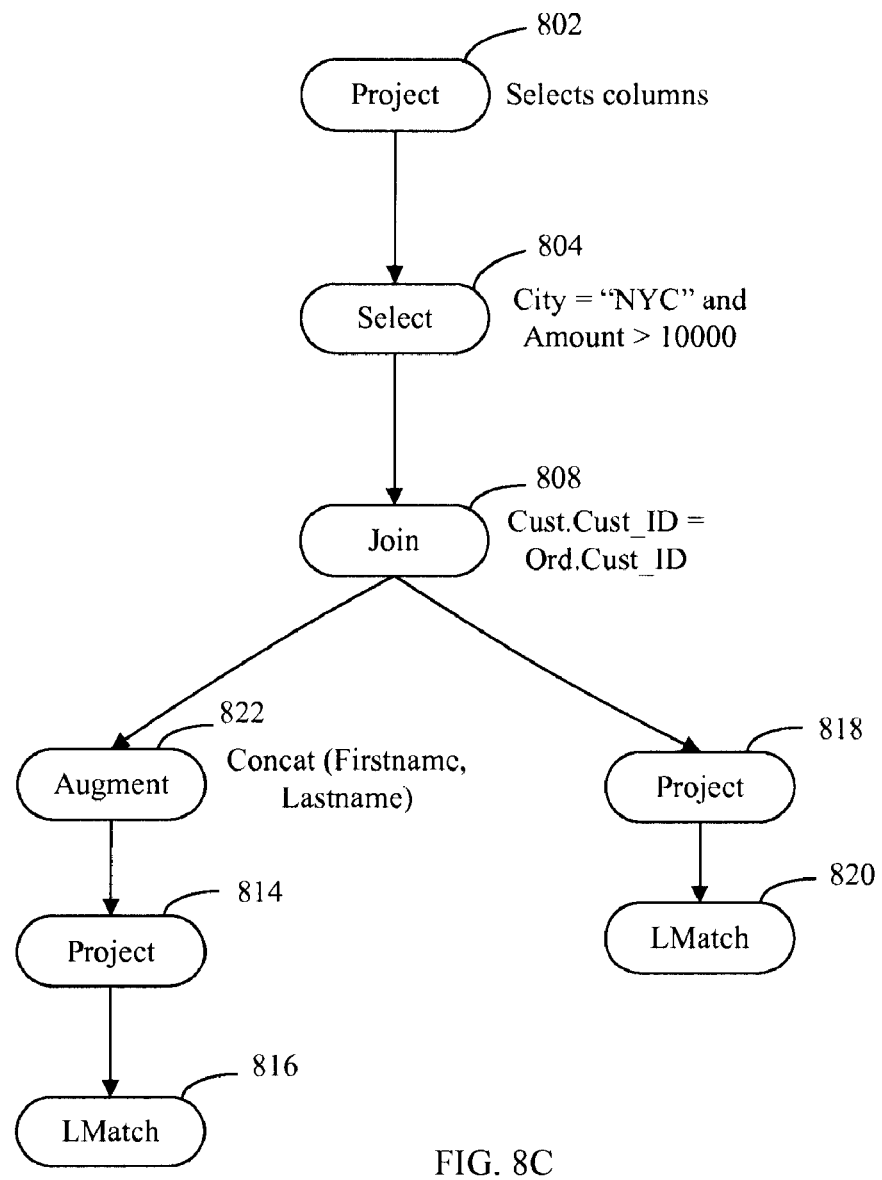

The operator tree may be optimized in a variety of ways. For instance, the operator tree may be restructured. As shown in FIG. 8C, the "Augment" (e.g., concatenation) operator has been pushed to the data source storing the Customers table. More particularly, the "Augment" operator 806 of FIG. 8C has been pushed closer to the data source, as shown at 822. Thus, the concatenation operation may be performed by the data source. Accordingly, the operator tree may be structured in accordance with each data source such that a different segment of the operator tree is associated with each data source.

In order to "push" an operator to a data source, the data source must support that operator. Thus, in accordance with one embodiment, an operator mapping associated with each data source is obtained. From the operator mapping, it is possible to determine whether a particular operator in the operator tree (e.g., concatenate) is supported by the data source. If the operator is supported by the data source, the data source may be instructed to execute the operator (e.g., by pushing the operator to the segment of the operator tree associated with the data source). However, if the operator is not supported by the data source, the operator may be executed external to the data source (e.g., by the execution engine). In other words, the operator may remain in its current location in the operator tree, since it cannot be executed by any of the data sources.

The restructuring of the operator tree may be performed in accordance with a hierarchy of operators. For instance, it may be desirable to perform the "Augment" operator prior to another operator. Thus, this hierarchy of operators may affect the manner in which the operator tree is structured. For instance, the operators may be executed in a top-down or bottom-up approach, which may affect the placement of the operators within a particular segment of the operator tree. Moreover, the hierarchy of operators may affect the order in which each operator is selected for optimization.

Figure 8D:
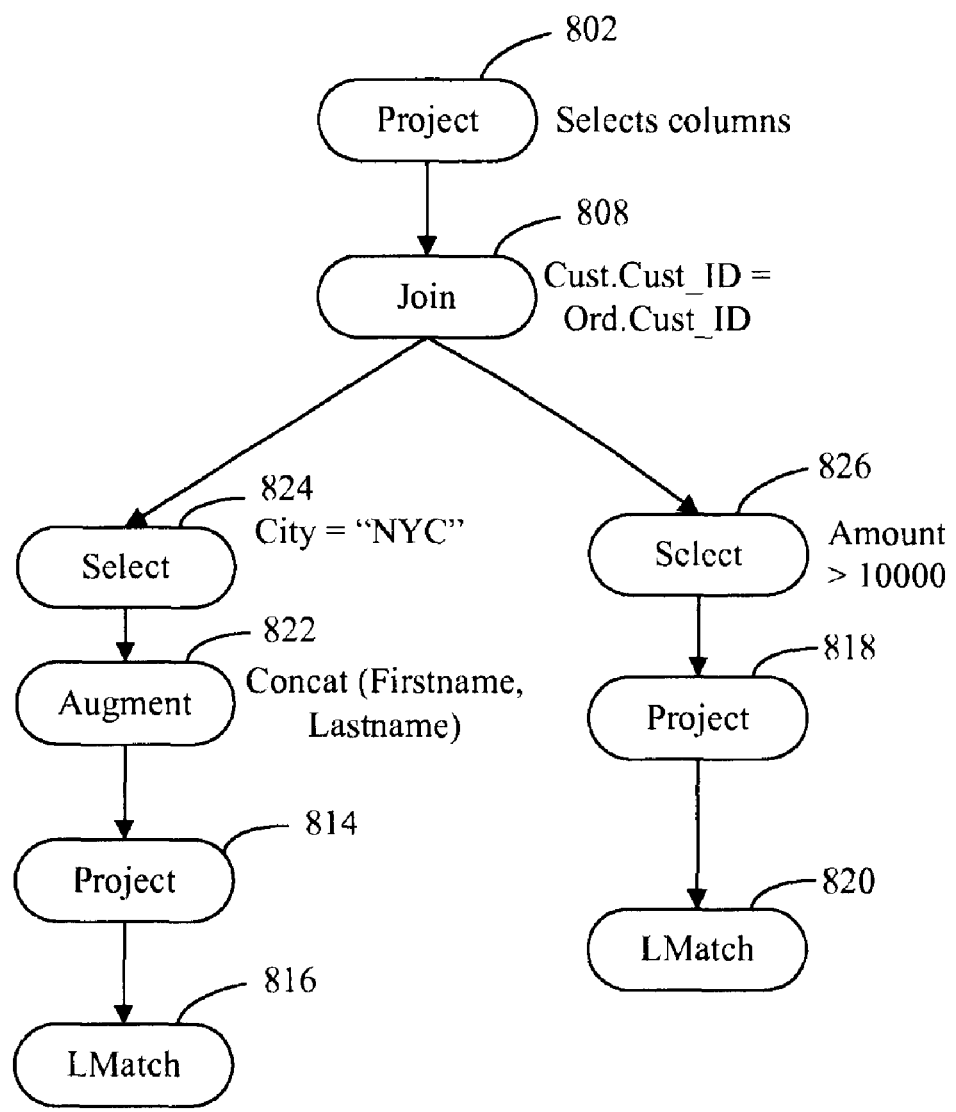

One of the optimization rules may specify that operators such as the "Select" operator are to be pushed to the data source. Thus, as shown in FIG. 8D, the "Select" operator 804 is "pushed" to the data sources. More particularly, the Customers in New York are selected at 824 from the Customers table such that selected rows of the Customers table are identified. Similarly, the Orders having an order amount that is greater than 10000 are selected at 826 from the Orders table such that selected rows of the Orders table are identified.

Figure 8E:
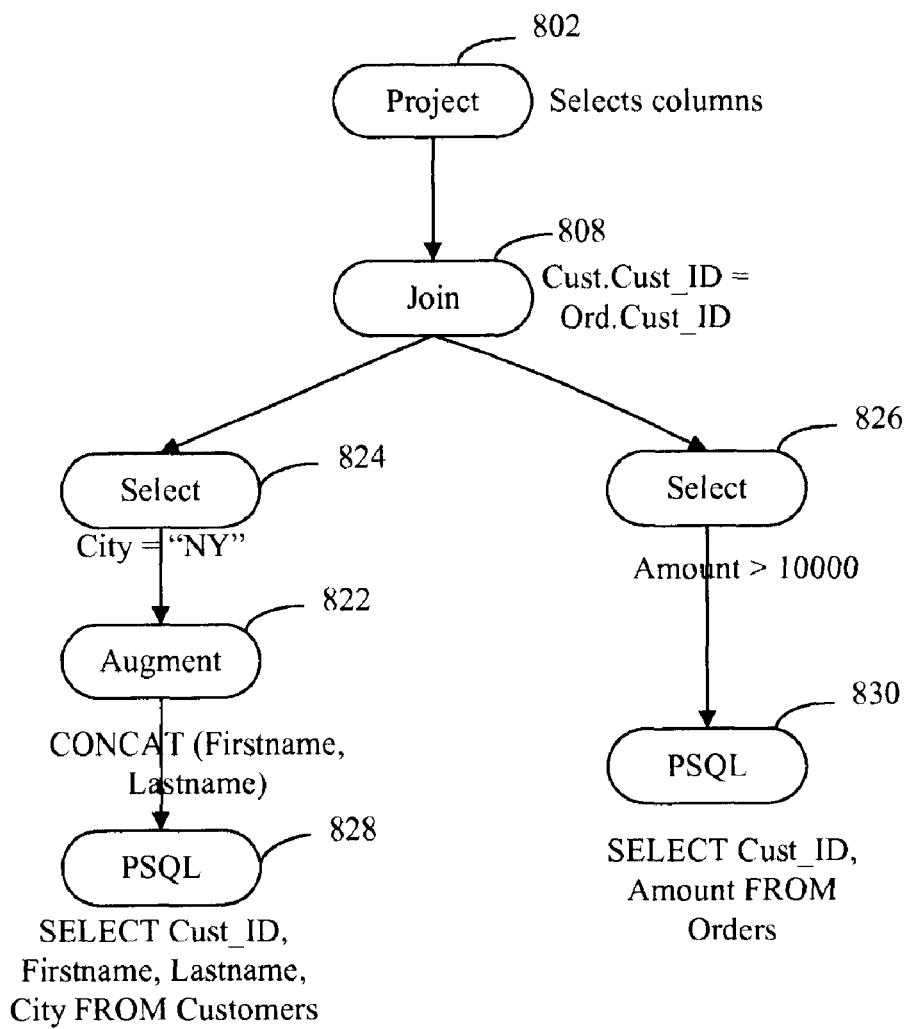

As shown in FIG. 8E, the "Project" operator 814 and "LMatch" 816 are merged to generate a SQL statement 828 to query the Customers table so that only columns that are referenced in the query and thus required are retrieved from the data source. Similarly, the "Project" operator 818 and "LMatch" operator 820 are merged to generate a SQL statement 830 to query the Orders table so that only columns that are referenced in the query and thus required are retrieved from the data source. Both SQL statements operate to select rows from the corresponding table. The rows that are selected are initially shown as *, which indicates that all rows are being selected.

Figure 8F:
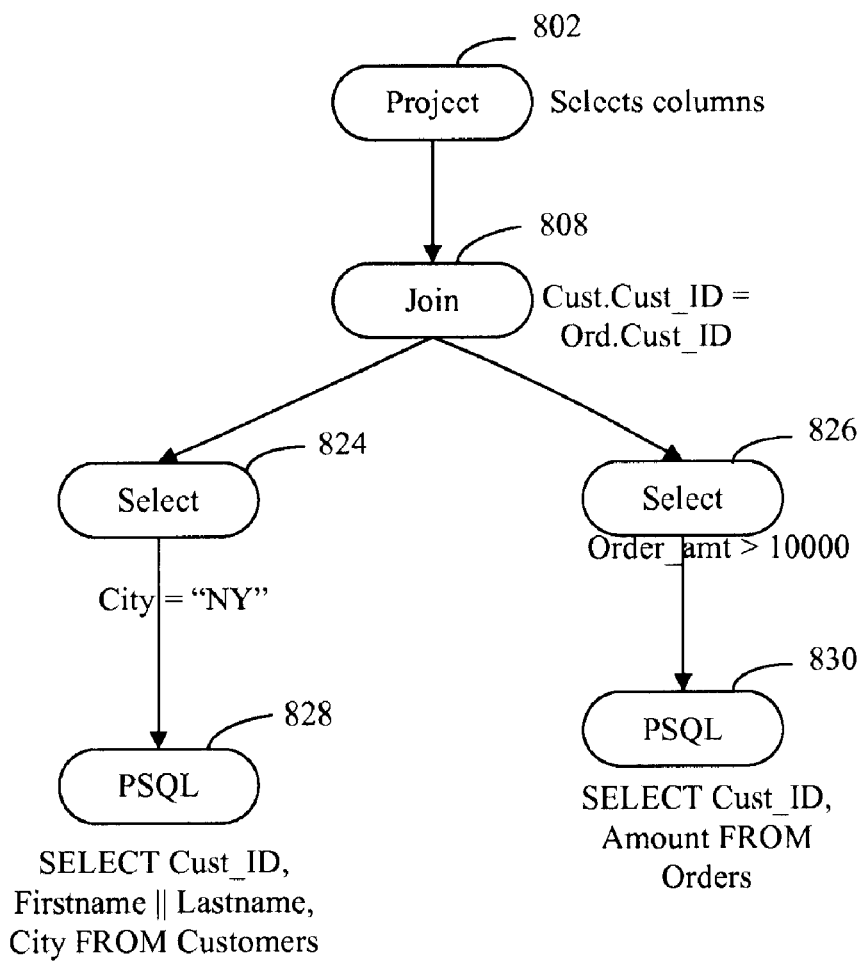

In accordance with one embodiment, one of the optimization rules determines whether an operator such as the "Augment" (e.g., concatenate) operator is directed to a single data source. If the "Augment" operator is directed to a single data source, the "Augment" operator 822 of FIG. 8E is then pushed to the data source. As a result, the "Augment" operator 822 is removed from the operator tree, as shown in FIG. 8F. Thus, the data source storing the Customers table performs the concatenation operation. In this manner, data source-specific fragments of the operator tree that have been identified as relating to a single data source may be "pushed" to the corresponding data source.

Figure 8G:
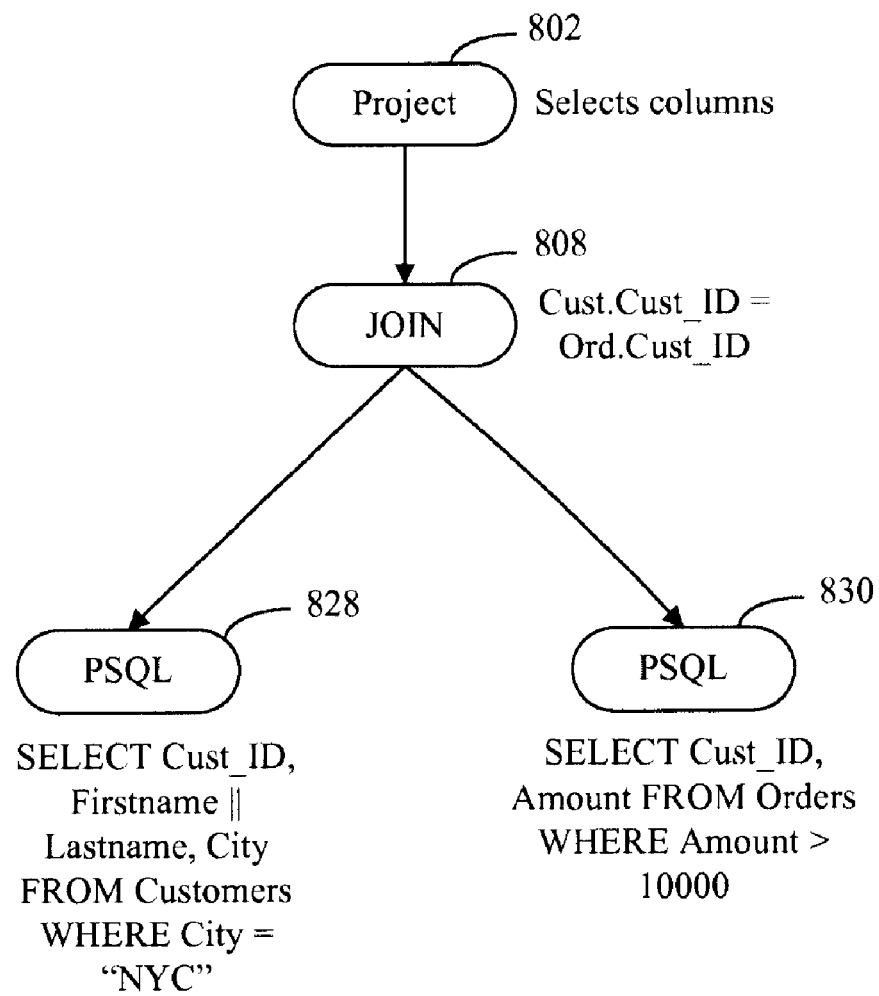

The "Select" operators 824, 826 are then pushed to the corresponding data sources, effectively "collapsing" the operator trees into a single operator tree. As shown in FIG. 8G, the resulting SQL statements 828, 830 are modified to incorporate the "Select" operators 824, 826 and corresponding conditions. More particularly, as shown at 828, the Customers from New York are selected to identify the rows of data to be retrieved from the Customers table. Similarly, as shown at 830, the Orders having an order amount greater than $10000 are selected to identify the rows of data to be retrieved from the Orders table.

As described above with reference to FIGS. 8A-8G, an operator tree may be generated and optimized. Optimization may involve restructuring of the operator tree, as well as "pushing" selected operators to the corresponding data sources. In this manner, a different set of one or more queries (e.g., SQL statements) may be generated for each of the data sources (and corresponding tables). As indicated above, the SQL statements may identify those columns for which data is being retrieved. As indicated above, the columns for which data is being retrieved are a superset of the indexed columns. Accordingly, each of the data sources may separately execute the corresponding set of queries. In this manner, operation intensive tasks may be offloaded to the data sources.

The compiler may select the appropriate column(s) to index. For instance, in this example, the compiler may select the Customer ID column to index. The execution engine may then build an index (e.g., B-tree index) on the selected column(s) and execute the join operation using the results provided by the data sources. For instance, the execution engine may build an index on the Customer ID column of the orders table. As set forth above, the execution engine need not wait for all rows of data from the data sources in order to perform a join on a row of data. Moreover, in accordance with one embodiment, only data for the columns referenced in the query is retrieved since the execution engine has built an index for only the selected column(s). In this manner, data is retrieved for only the columns referenced in the query, enabling a join to be executed on the indexed columns using the data retrieved from the tables (e.g., data sources). Upon completion of execution of the join operation, a new result set (e.g., table) is created from the retrieved data obtained from the tables for the identified column(s).

The manipulations performed are often referred to in terms, such as storing, providing, or generating. In any of the operations described herein that form part of the present invention, these operations are machine operations. Useful machines for performing the operations of the present invention include general-purpose digital computers, networks of such computers, or other programmable systems. In all cases, there is a distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer or network of computers selectively activated or reconfigured by a computer program stored on a machine readable medium. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

Still further, the present invention relates to machine-readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

A computer system may include a server and one or more clients. In preferred embodiments, software providing the disclosed functionality is provided on the server and can be accessed through the various clients. The server in accordance with the present invention includes a central processing unit (CPU), input/output (I/O) circuitry, and memory—which may be read only memory (ROM) and/or random access memory (RAM). The server may also optionally include a display, a mass storage unit, a keyboard, and a clock.

In one embodiment, the CPU is preferably one or more microprocessor chips selected from complex instruction set computer (CISC) microprocessors, reduced instruction set computer (RISC) microprocessors, or other available microprocessors. The CPU is coupled to a memory by a bi-directional data bus, but may also be coupled by a unidirectional data bus in the case of ROM. The memory is also coupled to the CPU by appropriate control and address busses, as is well known to those skilled in the art.

The CPU is coupled to the I/O circuitry by a bi-directional data bus to permit data transfers with peripheral devices. I/O circuitry preferably includes a number of latches, registers and direct memory access (DMA) controllers. The purpose of the I/O circuitry is to provide an interface between CPU and such peripheral devices as display assembly, mass storage (e.g., disks), keyboard, and clients. The display assembly of server receives data from the I/O circuitry via the bus and displays that data on a suitable screen. Mass storage can be coupled to I/O circuitry by a bi-directional data bus. Generally, mass storage will be a hard disk drive, a tape drive, or some other long-term storage device. It may be used to store tables of this invention, programs for accessing or generating such report tables, programs for performing the disclosed join functionality, and programs for generating a query plan for performing the disclosed join functionality.

The keyboard communicates with the CPU via data bus and I/O circuitry. In addition to keyboard, other types of input device can also be used in conjunction with the present invention. For example, a computer mouse, a track ball, a track pad, or a pen-based tablet can be used to manipulate a pointer on display screen. A clock preferably comprises a real-time clock to provide real-time information to the system. Alternatively, the clock can simply provide regular pulses to, for example, an interrupt port of the CPU, which can count the pulses to provide the time function. The clock is coupled to the CPU by a data bus.

The clients may include terminals, personal computers, workstations, minicomputers, and mainframes. For purposes of this invention, any data processing devices which can access the report templates (e.g., report objects) or report template generating software on server are clients. It should be understood that the clients may be manufactured by different vendors and may also run different operating systems such as MS-DOS, Microsoft Windows, Microsoft NT, various forms of UNIX, OS/2, MAC OS and others. Clients are connected to I/O circuitry via bi-directional lines. Bidirectional lines may be any suitable media such as coaxial cable, twisted pair wiring, fiber optic line, radio channels, and the like. Further, the network resulting from the interconnection of the lines may assume a variety of topologies, including ring, bus, star, and may include a collection of smaller networks linked by gateways and bridges. As with the clients, it should be understood that the server may run different operating systems such as MS-DOS, Microsoft Windows, Microsoft NT, UNIX, VMS, OS/2, MAC OS and others. The clients need not use the same operating system as the server.

Although the foregoing invention has been described in some detail for purposes of clarity of understanding, it will be apparent that certain changes and modifications may be practiced within the scope of the appended claims. For instance, although the specification has described an example employing an operator tree, other types of objects and data structures may be used as well. Moreover, the implementation of the disclosed operator tree optimizations is merely illustrative, and therefore optimizations may be performed in other manners as well. In addition, although the generation of the operator tree and optimizations are performed by a compiler in the above-described embodiments, such operations may be performed by other system components.

What is claimed is:

1. An apparatus for joining two or more tables, comprising:
   a processor; and
   a memory, at least one of the processor or the memory being adapted for:
   receiving a query including a join query, the join query requesting that a new result set be generated from data obtained from two or more tables, the two or more tables being stored at two or more different data sources, wherein each of the two or more tables is stored at a single one of the two or more different data sources;
   automatically generating a different set of one or more queries to each of the two or more different data sources based upon the query that has been received;
   retrieving data from the tables corresponding to the query by executing the set of one or more queries corresponding to each of the two or more different data sources; and
   creating the new result set from the retrieved data obtained from the tables;
   parsing the query;
   generating an operator tree from the parsed query
   identifying operations corresponding to operators in the operator tree that are supported by at least one of the two or more different data sources;
   obtaining an operator mapping for each of the two or more different data sources.

2. The apparatus as recited in claim 1, wherein the new result set is a single table.

3. The apparatus as recited in claim 1, wherein each of the tables is stored at a different one of the data sources.

4. The apparatus as recited in claim 1, at least one of the processor or the memory being further adapted for:
   restructuring the operator tree according to a hierarchy of operators.

5. The apparatus as recited in claim 1, wherein automatically generating a set of one or more queries to each of the two or more different data sources is performed based upon the operator tree.

6. The apparatus as recited in claim 1, at least one of the processor or the memory being further adapted for:
   pushing operations corresponding to operators in the operator tree to the two or more different data sources.

7. The apparatus as recited in claim 6, at least one of the processor or the memory being further adapted for:
   applying an operator mapping for each of the two or more different data sources to identify the operators that are supported by the two or more different data sources.

8. The apparatus as recited in claim 6, at least one of the processor or the memory being further adapted for:
   performing one or more operations corresponding to one or more operators in the operator tree external to the two or more different data sources.

9. The apparatus as recited in claim 1, at least one of the processor or the memory being further adapted for:
   performing one or more operations corresponding to one or more operators in the operator tree external to the two or more different data sources.

10. The apparatus as recited in claim 1, wherein the two or more tables are not in a single database.

11. The apparatus as recited in claim 1, wherein the query is received in the form of a query language.

12. The apparatus as recited in claim 1, at least one of the processor or the memory being further adapted for:
    restructuring the operator tree in accordance with each of the two or more different data sources such that a different segment of the operator tree is associated with each of the two or more different data sources.

13. The apparatus as recited in claim 12, at least one of the processor or the memory being further adapted for:
    pushing operations corresponding to operators in the operator tree to the two or more different data sources.

14. The apparatus as recited in claim 12, wherein automatically generating a set of one or more queries to each of the two or more different data sources is performed based upon the operator tree.

15. An apparatus for joining two or more tables, comprising:
    a processor; and
    a memory, at least one of the processor or the memory being adapted for:
    receiving a query including a join query, the join query requesting that a new table be generated from data obtained from two or more tables, the two or more tables being stored at two or more different data sources, wherein each of the two or more tables is stored at a single one of the two or more different data sources;
    identifying from the query one or more columns for each of the tables for which data is to be obtained;
    automatically generating a set of one or more queries to each of the two or more different data sources from the query;
    retrieving data from the tables for the corresponding identified columns by executing the set of one or more queries corresponding to each of the two or more different data sources;
    creating the new table from the retrieved data obtained from the tables for the corresponding identified columns;
    populating at least one row of the new table with a row of the retrieved data when data has been retrieved for at least one row for the identified columns, wherein populating at least one row of the new table is performed before data has been retrieved for all rows of the tables for the identified columns.

16. The apparatus as recited in claim 15, at least one of the processor or the memory being further adapted for:

ascertaining whether two or more of the identified columns are associated with different data sources.

17. The apparatus as recited in claim 15, wherein each of the tables is stored at a different one of the data sources.

18. The apparatus as recited in claim 15, wherein retrieving data from the tables for the corresponding identified columns includes retrieving only data for the corresponding identified columns from the tables.

19. The apparatus as recited in claim 15, wherein the retrieved data does not include data for all columns in the tables.

20. The apparatus as recited in claim 15, wherein retrieving data from the tables for the corresponding identified columns does not include retrieving data for all columns of the tables.

21. The apparatus as recited in claim 15, wherein retrieving data and creating the third table are performed in pipeline.

22. The apparatus as recited in claim 15, wherein the query is a SQL query.

23. The apparatus as recited in claim 15, wherein identifying from the query one or more columns for each of the tables for which data is to be obtained is performed by a compiler.

24. The apparatus as recited in claim 15, wherein identifying from the query one or more columns for each of the tables for which data is to be obtained comprises:
identifying the columns from a join clause of the join query.

25. The apparatus as recited in claim 15, at least one of the processor or the memory being further adapted for:
generating a plurality of SQL statements from the query, thereby enabling the data to be retrieved and the third table to be generated.

26. The apparatus as recited in claim 25, wherein generating a plurality of SQL statements is performed by a compiler.

27. The apparatus as recited in claim 25, at least one of the processor or the memory being further adapted for:
generating a different set of one or more SQL statements for each of the tables corresponding to the identified columns.

28. The apparatus as recited in claim 27, at least one of the processor or the memory being further adapted for:
executing the set of SQL statements for each of the tables.

29. The apparatus as recited in claim 27, wherein retrieving the data and creating the third table comprises executing the set of SQL statements for each of the tables.

30. The apparatus as recited in claim 25, wherein the query is received from a user.

31. The apparatus as recited in claim 15, wherein the query is received in the form of a query language.

32. An apparatus for joining two or more tables, comprising:
a processor; and
a memory, at least one of the processor or the memory being adapted for:
receiving a query including a join query, the join query requesting a join of the two or more tables, the two or more tables being associated with two or more data sources, wherein each of the two or more tables is stored at a single one of the two or more different data sources;
identifying from the query one or more columns of the tables to index;
building an index for each of the identified columns of the table;
automatically generating a set of one or more queries corresponding to each of the two or more data sources from the query;
retrieving data from the tables for a set of one or more columns of the tables corresponding to the received query by executing the set of one or more queries corresponding to each of the two or more data sources; and
executing a join on the indexed columns of the tables using the retrieved data, wherein executing a join is performed when data has been retrieved from at least one row of the two or more tables for the indexed columns.

33. The apparatus as recited in claim 32, wherein the data is retrieved from the indexed columns.

34. The apparatus as recited in claim 32, wherein each of the tables is associated with a different one of the data sources.

35. The apparatus as recited in claim 32, wherein retrieving data includes retrieving only data for columns required to process the query are obtained.

36. The apparatus as recited in claim 32, wherein the retrieved data does not include data for all columns in the tables.

37. The apparatus as recited in claim 32, wherein retrieving data includes retrieving data from the tables for the corresponding indexed columns.

38. The apparatus as recited in claim 32, wherein executing a join is performed before data has been retrieved for all rows of the tables for the indexed columns.

39. The apparatus as recited in claim 13, wherein retrieving data and executing a join are performed in pipeline.

40. The apparatus as recited in claim 13, wherein the query is a SQL query.

41. The apparatus as recited in claim 13, wherein identifying from the query one or more columns of the tables to index is performed by a compiler.

42. The apparatus as recited in claim 13, wherein identifying from the query one or more columns of the tables to index comprises:
identifying the columns from the join query.

43. The apparatus as recited in claim 13, at least one of the processor or the memory being further adapted for:
generating a plurality of SQL statements from the query, thereby enabling the join to be executed.

44. The apparatus as recited in claim 43, wherein generating a plurality of SQL statements is performed by a compiler.

45. The apparatus as recited in claim 32, at least one of the processor or the memory being further adapted for:
generating a different set of one or more SQL statements for each of the tables.

46. The apparatus as recited in claim 45, wherein executing the join comprises executing the set of SQL statements for each of the tables.

47. The apparatus as recited in claim 46, wherein executing the set of SQL statements is performed by the data sources.

48. The apparatus as recited in claim 45, wherein retrieving the data and executing the join on the indexed columns comprises executing the set of SQL statements for each of the tables.

49. The apparatus as recited in claim 48, wherein executing the set of SQL statements is performed by the data sources.

50. The apparatus as recited in claim 32, wherein the query is received from a user.

51. The apparatus as recited in claim 32, wherein the query is received in the form of a language.

* * * * *